CHARLES SIEBURG & CARL SIEBURG, Jr.
DEVICE FOR AGITATING FLUIDS.
APPLICATION FILED OCT. 9, 1911.
1,098,594.
Patented June 2, 1914.
2 SHEETS—SHEET 2.
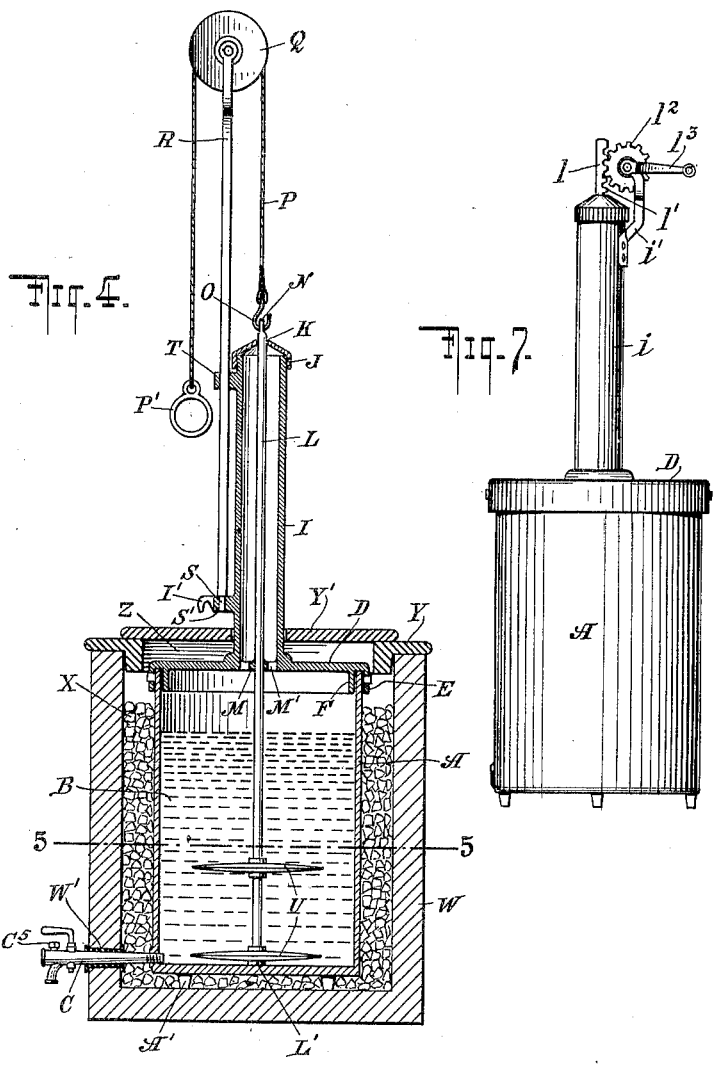
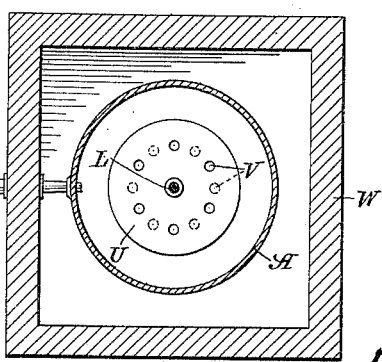

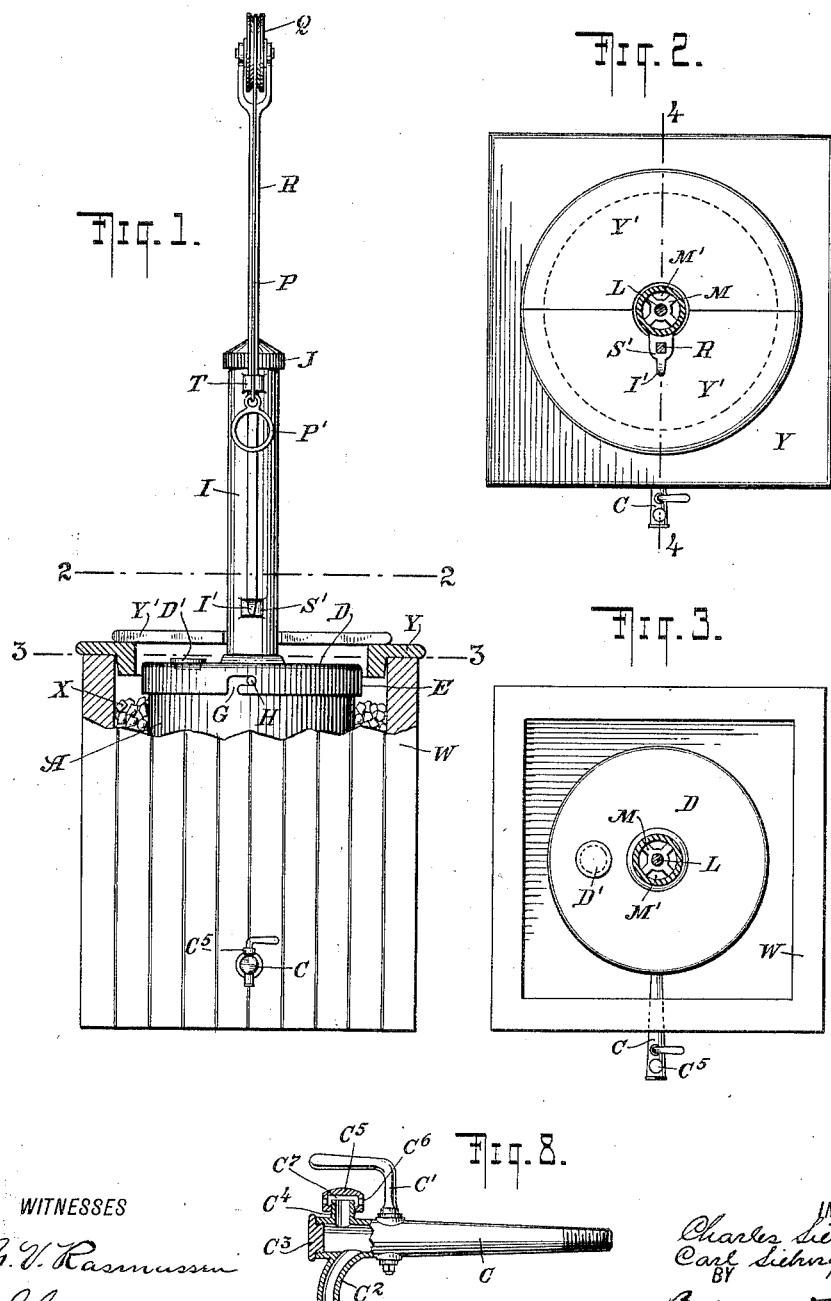

UNITED STATES PATENT OFFICE.

CHARLES SIEBURG AND CARL SIEBURG, JR., OF NEW YORK, N. Y.

DEVICE FOR AGITATING FLUIDS.

1,098,594.  Specification of Letters Patent.  Patented June 2, 1914.

Application filed October 9, 1911.  Serial No. 653,568.

*To all whom it may concern:*

Be it known that we, CHARLES SIEBURG and CARL SIEBURG, Jr., both citizens of the United States, and both residents of the borough of Brooklyn, county of Kings, city and State of New York, have jointly invented certain new and useful Improvements in Devices for Agitating Fluids, of which the following is a specification.

Our invention relates to devices for periodically agitating fluids, such as buttermilk, a combination of milk and cream or any other fluid, the constituents of which have a tendency to settle or otherwise become separated after the fluid has been at rest or undisturbed for a period of time.

The object of our invention is to provide an easily operated device of this description which, when actuated, will effectively agitate the particular fluid to evenly mix or distribute the various constituents throughout said fluid.

A further object of our improvement is to so construct the same that it may be readily disassembled for any purpose, as for instance for the purpose of cleaning, and then again quickly and conveniently reassembled.

Our invention will be fully described hereinafter and the features of novelty will be pointed out in the appended claims.

Reference is to be had to the accompanying drawings in which—

Figure 1 is an exterior elevation partly in section of our improved device; Fig. 2 is a horizontal section thereof on the line 2—2 of Fig. 1; Fig. 3 is a similar view on the line 3—3 of Fig. 1; Fig. 4 is a vertical section on the line 4—4 of Fig. 2; Fig. 5 is a section on the line 5—5 of Fig. 4; Fig. 6 is a plan view partly in section of another form of agitator; Fig. 7 is an elevation of another form of our improved device, and Fig. 8 is an enlarged detail section of the spigot.

In the specific illustration our improved device comprises a receptacle A arranged to contain a fluid B, and having an outlet into which a spigot C, for the withdrawal of the fluid or a quantity thereof is preferably secured in any suitable and convenient manner. The open end of the receptacle A is closed by means of a cover D, which has a peripheral depending flange E, arranged to extend over and engage the outer surface of said receptacle and may, if desired, be further provided with an additional annular flange F, arranged to project into and engage the inner surface of said receptacle as shown best in Fig. 4. It is preferable to have the said cover D secured or locked in position on the receptacle so that during the operation of the device, no accidental dislocation of said cover can occur and any suitable fastening means may be provided for this purpose, or the frictional engagement between the cover and receptacle may be relied on to secure this result. In the drawings, we have shown the cover provided with bayonet slots G, which coöperate with pins or projections H, located on the receptacle A, to lock said cover D against accidental removal. The said cover is further provided with an upwardly extending sleeve or tube I, preferably formed integral therewith and having its upper open end closed by means of a closure J, which may be secured in position by means of coöperating screw threads or by means of a bayonet fastening or other means as desired. The transverse portion of said closure is preferably conical in shape and provided with an axial opening K at the apex of the cone for the accommodation of a reciprocating rod or similar element L, which extends lengthwise of the sleeve I and passes through and is slidable in an opening M, located in the cover D, it being understood that the openings K and M are in axial alinement. The rod or similar element L preferably fits in said openings K and M with what is known as a running fit for the purpose to be more clearly described hereinafter.

The upper or exposed end of the rod L is provided with an eyelet N for the reception of a hook or similar easily removable device O, which in turn is itself secured to the one end of a chain, wire, rope or other cable P, which passes over a pulley Q and has its free end attached to a ring or other operating handle P'. The pulley Q is journaled in the forked end of a standard R, the opposite end of which is preferably reduced to form a shoulder and is removably positioned in a socket S formed in a projection S', located on the tube I and preferably integral therewith. The shoulder formed by the reduced end of the standard R rests on the projection S' and properly positions the standard R and pulley Q. In order to maintain the standard R rigidly in upright or operative position we preferably provide a securing device T, located on the tube I intermediate of the ends of the standard R, and which may be in the nature of a simple ring or eyelet through which the standard R passes. The standard R is preferably of angular cross-section and the opening in the device T similarly shaped to prevent rotation of the standard R about its axis.

A plurality of agitators preferably, though not necessarily, in the nature of disks U are secured in any suitable manner to that portion of the rod L, which reciprocates within the receptacle A, so as to extend across the axis of the said receptacle. In the preferred construction the disks U are spaced from each other and formed with perforations V and are fixed on the rod so that the perforations of one disk will be out of registry with those of an adjacent disk, although this is not absolutely necessary, and if desired the perforations may even be omitted entirely. The surfaces of the disks J are also preferably made convex or curved for the purpose to be more fully brought out hereinafter.

Instead of the disks U, the projecting fingers U' shown in Fig. 6 may be used, in which case the fingers of one agitator are preferably staggered in relation to the fingers of an adjacent agitator. Under certain conditions a single agitator, either a disk or projecting fingers may be found sufficient for all purposes, and we desire it to be understood that we do not limit ourselves to the use of a plurality of agitators. These disks U or projecting fingers U', as can be seen by referring to the drawings, preferably, have their peripheries or ends spaced from the inner surface of the receptacle, so that the fluid may readily pass said disks or fingers as the device is operated.

Apertures M' are formed in the cover D, so as to communicate with the interior of the receptacle and are located entirely within the tube I, and surrounding the aperture or opening M, as shown in Fig. 3.

It will often be found desirable, owing to the nature of the particular fluid, or for other reasons, to cool and maintain said fluid in a cool condition or at a low temperature. In such cases the receptacle may be located in a container W, open at the top and having an opening W' for the accommodation of the spigot C, and arranged to contain a cooling medium X, such as ice or the like. The container W is somewhat larger and higher than the receptacle A, which is also preferably spaced from the bottom of the container, so that when the parts are assembled a space is formed about the entire receptacle into part of which the ice or other cooling medium may be introduced so as to expose the entire surface of said receptacle to the effects of the cooling medium. If desired, instead of being surrounded by ice, the said receptacle may be located within a coil of any well known description through which a cooling fluid travels. In order to maintain the cooling medium, whatever its character may be, out of contact with the surrounding atmosphere, the open end of the container W is preferably closed by means of a main removable cover Y, having an aperture Z, through which the tube I extends and which is itself covered or closed by a secondary cover Y' as illustrated best in Fig. 4. The secondary cover Y' may be made of two halves, each provided with a recess arranged to fit about the tube I, so that said secondary cover may be easily removed when desired. The receptacle A, as has already been stated, may also, if desired, be spaced from the bottom of the container W, and with this object in view may be provided with supporting lugs A', thus presenting a maximum amount of surface of the container to the action of the cooling medium.

In operation each time it is intended to withdraw a quantity of fluid from the receptacle A, the ring or other handle P' is first pulled downward, thus causing the cable P to ride over the pulley Q and an upward pull to be exerted on the rod or other element L. This operation will cause the rod L to move upwardly in the direction of its axis and will propel the disks U or fingers U', as the case may be, through the fluid toward the top of the receptacle. This upward movement may be only of slight extent or may continue until the uppermost disk or other agitator on the rod O comes into contact with the cover D, whereupon this upward movement will be arrested. As soon as this has taken place the ring P' is released and the rod L and disks U or fingers U' will immediately begin to move through the fluid in the opposite direction, this latter movement in the specific illustration being occasioned by gravity. During both the movements just described the fluid will be stirred up or agitated, and any constituents which may have settled toward the bottom or become otherwise separated will be disturbed and will be evenly mixed or distributed throughout the entire fluid. If the agitating disks U are perforated, some of the fluid will pass through the perforations V in undulating paths owing to the fact that the perforations in one disk are out of registry with the perforations of adjacent disk and will form eddies in the fluid, which condition is also secured if the fingers U' arranged in staggered relation to each other are used. A more distributed or thorough agitation is therefore secured than if unperforated disks are used. The fluid may now be withdrawn through the spigot C, in the desired quantity and will always have the same characteristics if the device is first actuated as described each time a supply of fluid is desired. It will be seen that the movement of the agitators brought about by exerting a pull on the cable P, will be a relatively rapid one, and the gravity movement a relatively slow movement, so that the fluid is quickly stirred up and mixed, and it is unnecessary to wait for the agitators to completely return to normal position before withdrawing the desired quantity of fluid. In some cases it may be desirable to have the upward movement of the agitators a slow movement and the downward movement thereof a rapid one, the movements in both directions either slow or rapid, and we wish it distinctly understood that we consider such adaptations of our device as within the scope of our invention. By curving the faces of the agitators U as described, the fluid readily passes over the same as the device is actuated and resistance to the said actuation and friction is reduced to a minimum. The lower curved surface of the lowest agitator U also prevents the said agitator from sticking to the bottom of the receptacle if the fluid should happen to be a sticky one, as only a relatively small portion of said curved surface will engage the bottom of the container when the device is at rest. If desired, a stop L' may be provided to maintain the agitator out of contact with the bottom of the receptacle, which stop may be movable with the agitator, or may be fixed on the bottom of said receptacle.

Our improvement in its various forms, is extremely valuable for use in restaurants or other places where the receptacles for the various fluids, such as for instance buttermilk or a mixture of milk and cream, are for instance arranged in rows and are of large capacity. These receptacles remain substantially stationary and undisturbed throughout the business period and the fluid is drawn therefrom only as required. In cases of this kind the respective fluids are introduced into the various receptacles before the business period begins and ordinarily remain unagitated or undisturbed throughout the said business period, excepting as it is necessary to draw the fluid therefrom through the spigot. Under such conditions, the heavier constituents would, after a time, settle toward the bottom of the receptacle so that the portions of the fluid first withdrawn would either be inferior or superior to the portions withdrawn later, this depending on the nature of the fluid. That is, in the case of a mixture of milk and cream, the cream would rise toward the top of the receptacle and would be available only after all the milk had been withdrawn. With our device, a periodical operation thereof, as described, causes an agitation of the fluid and an even mixture of distribution of the constituents thereof throughout the entire fluid contained in the particular receptacle. The said fluid, when withdrawn or served, is therefore, at all times of the same quality and all portions thereof have the same general characteristics.

As the rod L and agitators U or U' are raised, any such fluid as may adhere to said rod and be carried upward thereby, will be removed from the rod by the periphery or wall of the opening M, owing to the running fit of said rod therein. Should any part of the fluid remain on the rod and be carried out of the receptacle and into the tube I, this fluid will flow downwardly along said rod and through the apertures M' back into the receptacle. If the quantity of said fluid which is carried out of the receptacle in this manner should be considerable, the tube I will prevent the same from spreading and will confine it so that the entire quantity whatever it may be, will be returned to the receptacle. The tube I also serves as a protecting means to prevent contamination of any of the fluid which may adhere to the rod as it is withdrawn from the receptacle. It will be seen that with this structure no portion of that part of the rod which enters the interior of the receptacle is at any time exposed to the atmosphere and is consequently protected at all times.

When it is desired to clean our device or to introduce the supply of fluid to the receptacle it is desirable to maintain the rod L and agitators U or U' in their raised condition so that the cover D and the rod and agitators and connected and coöperating elements may be removed as a unit. To meet this contingency we have provided a hook I' which may be secured in any convenient location on the tube I, or as shown, may form part of the projection S', and with which the ring or other operating handle P' may be engaged. The ring P' and hook I' when thus coupled together will prevent any sliding movement of the rod L and its connected parts, so that the cover D and the elements supported thereby may be removed as a unit and need not at this time be disconnected and individually handled. This is important when it is desired to introduce or replenish the contents of the receptacle, although if desired, the cover D may be provided with a suitably located opening D' through which the contents may be introduced, thus making it unnecessary to remove the cover for this purpose. This opening D' may be normally sealed by a cover of any suitable description.

If the cover D and its connected parts are removed for the purpose of cleaning, after such removal has taken place the hook O is disconnected from the rod L, and this rod then slipped through the openings K and M. The standard R is then removed from the socket S and slid lengthwise through the ring T, so as to disconnect this standard from the tube I and cover D. The closure J, if desired, can also be removed from the tube I, so that all the parts are free and can be easily and thoroughly scoured, cleaned and sterilized if desired, after which the parts may be easily and quickly reassembled. When reassembling the parts the rod L will be automatically guided to the opening K, owing to the conical formation of the transverse portion of the closure J, so that it is unnecessary to carefully manipulate these parts to reinsert the rod L through the opening K. It will be seen that our device is thus sanitary and easily kept free from germs and other foreign matter and easily and quickly taken apart and reassembled.

In Fig. 7 we have shown the rod $l$ corresponding to the rod L, provided with a rack $l'$ which meshes with a pinion $l^2$ journaled on a bracket $i'$ secured to a tube $i$ corresponding to the tube I. This pinion $l^2$ is provided with an operating crank $l^3$ through the medium of which it may be rotated to raise the rack $l'$ and with it the rod $l$ when it is desired to agitate the fluid. The rod $l$ and the rack $l'$ with connected parts may be returned to normal position by gravity in the same manner as in the form first described. The rack and pinion mechanism of Fig. 7 thus take the place of the pulley and cable of the form of device shown in Figs. 1 and 3. Otherwise the construction and operation of the form shown in Fig. 7 may be the same as in the form first described. Instead of the two forms of mechanism for operating agitators so far described, other means or mechanism suitable for the purposes may be substituted as found necessary.

It is to be understood that it is desirable that the agitators be positively actuated by suitable mechanism in at least one direction of movement and that the movement of the agitators in any other direction, or specifically speaking, the opposite direction, may be brought about by gravity or by suitable mechanism as desired. It is further to be understood that the cable P may in some cases be attached directly to the agitators, and the rods L omitted. These agitators may also be of any suitable construction other than the forms shown and described and may be adapted to the needs of special cases as is found necessary. It is also to be noted that the agitators may be raised or positively moved in one direction by means of an electrically or other power-driven drum upon which the cable P is wound and then released to permit the agitators to freely move in the opposite direction.

In order to prevent dripping of the fluid or a portion thereof from remaining in the outlet of the spigot after the valve C' has been opened and closed, we provide the particular form of spigot shown in Fig. 8. In addition to the usual valve C', spout $C^2$ and removable cap $C^3$ the said spigot is formed with an upwardly extending tubular projection $C^4$ exteriorly screw-threaded to receive the cap $C^5$ and located in front of the valve C'. This cap is provided with apertures, $C^6$ communicating with an interior chamber $C^7$ having a somewhat larger inner diameter than the outer diameter of the projection, $C^4$ as clearly shown in Fig. 8. When the parts are in the position shown in the illustration and the valve C' has been opened to permit a portion of the fluid to pass from the receptacle A and then closed, air will pass through the apertures $C^6$ into the chamber $C^7$ and the projection $C^3$ to the interior of the spigot and will force any fluid in that portion of the spigot which is in front of the valve C' out of the spout $C^2$. The outlet end of the spigot is therefore completely freed from fluid each time the valve is opened and closed, thus preventing any of the fluid from remaining therein and becoming stale or otherwise contaminated, and at the same time effectually and completely preventing dripping.

The cap $C^5$ may be adjusted on the projection $C^4$ to regulate the inflow of air and if for any reason it should be desired, may be screwed down to completely seal the open end of the projection $C^4$ in which condition of the parts no air would pass through the apertures $C^6$ into the interior of the spigot. By removing both caps $C^3$ and $C^5$ the spigot may be easily and thoroughly cleaned.

Various other changes in the specific forms shown and described may be made within the scope of the claims without departing from the nature of our invention.

We claim:

1. The combination of a receptacle for a fluid, a rod extending into said receptacle and capable of being reciprocated therein, a plurality of perforated disks carried by said rod in spaced relation to each other and movable through said fluid to agitate the same, the perforations of one disk being out of registry with those of another disk whereby an undulating motion is imparted to the fluid as the disks are moved, mechanism for positively moving said rod and disks in one direction, a container for said receptacle and a spigot extending through said container and connected with said receptacle.

2. The combination of a receptacle for a fluid, a rod mounted to slide in said receptacle, means carried by said rod and movable through the fluid for agitating the same, said means normally being below the surface of the fluid, means for actuating said rod and agitating means and a tube extending upwardly from said receptacle and of a height corresponding approximately to the depth of the receptacle, whereby that portion of the rod which is normally within said receptacle and which is moved out of the same as the agitating means is actuated is always covered.

3. The combination of a receptacle for a fluid, a rod mounted to slide in said receptacle, means carried by said rod and movable through the fluid for agitating the same, said means normally being below the surface of the fluid, means for actuating said rod and agitating means, a tube extending upwardly from said receptacle and of a height corresponding approximately to the depth of the receptacle, whereby that portion of the rod which is normally within said receptacle and which is moved out of the same as the agitating means is actuated is always covered, and a device in said tube for removing the fluid from said rod during the actuation of said agitating means.

In testimony whereof we have hereunto set our hands in the presence of two subscribing witnesses.

CHARLES SIEBURG.
CARL SIEBURG, Jr.

Witnesses:
JOHN A. KEHLENBECK,
M. H. LOCKWOOD.

Copies of this patent may be obtained for five cents each, by addressing the "Commissioner of Patents, Washington, D. C."